(12) United States Patent
Palme et al.

(10) Patent No.: US 7,041,959 B1
(45) Date of Patent: May 9, 2006

(54) SYSTEM AND METHOD FOR MONITORING THE PERFORMANCE OF DENSE WAVELENGTH DIVISION MULTIPLEXING OPTICAL COMMUNICATIONS SYSTEMS

(75) Inventors: Dieter Palme, Munich (DE); Adalbert Bandemer, Munich (DE)

(73) Assignee: Thorlabs GmbH, Karlsfeld (DE)

( * ) Notice: Subject to any disclaimer, the term of this patent is extended or adjusted under 35 U.S.C. 154(b) by 0 days.

(21) Appl. No.: 09/806,704

(22) PCT Filed: Oct. 4, 1999

(86) PCT No.: PCT/EP99/07340
§ 371 (c)(1),
(2), (4) Date: Jun. 27, 2001

(87) PCT Pub. No.: WO00/21224
PCT Pub. Date: Apr. 13, 2000

(30) Foreign Application Priority Data
Oct. 4, 1998 (DE) .......................... 198 45 701

(51) Int. Cl.
*H01J 40/14* (2006.01)

(52) U.S. Cl. ...................... 250/225; 250/227.23; 398/89
(58) Field of Classification Search .................. 250/225, 250/237 G, 237 R, 227.23, 227.18; 359/114, 359/115, 124, 110; 398/89, 79
See application file for complete search history.

(56) References Cited

U.S. PATENT DOCUMENTS

| 2,922,331 A | 1/1960 | Fastie |
| 3,917,407 A | 11/1975 | Newstead |
| 3,936,191 A | 2/1976 | Chupp |
| 4,025,196 A | 5/1977 | Chupp et al. |

(Continued)

FOREIGN PATENT DOCUMENTS

| DE | 2 437 253 | 5/1975 |
| DE | 19 816 612 A1 | 10/1999 |
| EP | 0 810 752 A3 | 12/1997 |
| EP | 0 810 752 A2 | 12/1997 |
| EP | 0 855 811 A2 | 7/1998 |
| EP | 0 859 249 A1 | 8/1998 |
| EP | 1 135 707 B1 | 9/2001 |

OTHER PUBLICATIONS

Amrani A et al.: "Degradation surveilliance module for optical transport networks," Conference Proceedings, LEOS' 98. 11$^{th}$ Annual Meeting. IEEE Lasers and Electro–Optics Society 1998 Annual Meeting (CAT. No. 98CH36243), Conference Proceedings, LEOS'98. 11$^{th}$ Annual Meeting. IEEE Lasers and Electro–Optics Society 1998 Annual Meeting, Or, Dec. 1, 1998, pp. 289–290, vol. 1, Piscataway, NJ, USA IEEE, USA ISBN: 0–7803–4947–4.

(Continued)

*Primary Examiner*—Thanh X. Luu
*Assistant Examiner*—Stephen Yam
(74) *Attorney, Agent, or Firm*—Finnegan, Henderson, Farabow, Garrett & Dunner, L.L.P.

(57) ABSTRACT

A system and method for monitoring all the characteristic parameters of a DWDM communication system is implemented with two variants. Firstly, this is achieved by means of a specific grating spectrometer displaying a high resolution and a high-speed sampling of the measured values, and secondly by the application of an opto-electronic cross correlator as a purely electronic solution. The grating spectrometer is expediently a particular system in a mixed array according to Ebert and Fastie, wherein the light to be measured passes four times through the grating in a specific manner. The opto-electronic cross correlator can mix the working light with a reference light tunable in terms of its frequency to form an electrical low-frequency signal that is analyzed in a high-impedance operation.

22 Claims, 4 Drawing Sheets

U.S. PATENT DOCUMENTS

| | | | | |
|---|---|---|---|---|
| 4,299,488 | A | | 11/1981 | Tomlinson, III |
| 4,926,429 | A | * | 5/1990 | Chung .......................... 372/32 |
| 5,233,405 | A | * | 8/1993 | Wildnauer et al. .......... 356/333 |
| 5,396,361 | A | | 3/1995 | Sasaki et al. |
| 5,420,416 | A | | 5/1995 | Iida et al. |
| 5,532,818 | A | | 7/1996 | Tokumoto |
| 5,617,234 | A | * | 4/1997 | Koga et al. .................... 398/14 |
| 5,748,815 | A | * | 5/1998 | Hamel et al. .................. 385/37 |
| 5,780,843 | A | * | 7/1998 | Cliche et al. ................ 250/226 |
| 5,796,479 | A | * | 8/1998 | Derickson et al. .......... 356/326 |
| 5,812,262 | A | | 9/1998 | Ridyard et al. |
| 5,835,199 | A | * | 11/1998 | Phillips et al. ............. 356/28.5 |
| 5,894,362 | A | * | 4/1999 | Onaka et al. ................. 398/95 |
| 6,069,697 | A | * | 5/2000 | Tanimoto et al. ........... 356/327 |

OTHER PUBLICATIONS

Amrani et al. "Optical Monitoring System for Scalable All-optical networks," Conference Proceedings. LEOS '97, 10$^{th}$ Annual Meeting. IEEE Lasers and Elecro–optics Society 1997 Annual Meeting. IEEE Lasers and Electro–Optics Society 1997 Annual Meeting. LEOS '97. 10$^{th}$ Annual Meeting Nov. 10, 1997, pp. 270–271, vol. 2, XP002134592 1996, New York, NY, USA, IEEE, USA ISBN: 0-7803-3895-2.

Asahi K. et al. "Optical Performance Monitor Built into EDFA Repeaters for WDM Networks," OFC '98, Optical Fiber Communication Conference and Exhibit, Technical Digest, Conference Edition. 1998 OSA Technici Digest Series vol. 2 (IEEE Cat No. 98CH36177), OFC '98 Optical Fiber Communication Conference and Exhibit. pp. 318–319, XP002134593 1998, Washington, DC, USA, Opt. Soc. America, USA ISBN: 1-55752-521-8.

Berger M. et al. "Pan–European Optical Networking Using Wavelength Division Multiplexing" IEEE Communications Magazine, US, IEEE Service Center, Piscataway, NJ, vol. 35, No. 4, Apr. 1, 1997, pp. 82–88, XP00693608 ISSN: 0163–6804.

Bischoff M et al.: "Operation and Maintenance for an All–optical Transport Network," IEEE Communications Magazine, US, IEEE Service Center, Piscataway, NJ, vol. 34, No. 11, Nov. 1996, pp. 136–142 XP000636137 ISSN: 0163–6804.

Fastie, "Ebert Spectrometer Reflections," *Physics Today* , pp. 37–43 (Jan. 1991).

Fastie, "A Small Plane Grating Monochromator," *Journal of the Optical Society of American*, vol. 42, No. 9, pp. 641–647 (Sep. 1952).

Response to Examination report filed in corresponding European Application No. 99 950 610.8 on Aug. 7, 2002.

"Analytical Emission Spectroscopy" edited by E.L. Grove, Section 4 by R.N. Barnes and R.F. Jarrell "Gratings and Grating Instruments," New York, M. Dekker, pp. 255–309 (1971).

Caspar et al., "Automatic Switching System in Optical Heterodyne Technique," *European Conference on Optical Communication (ECOC)*, Helsinki, Sep. 13–17, 1987 vol. 1, Conf. 13 (Sep. 13, 1987).

May, Randy D. "Correlation–based Technique for Automated Tunable Diode Laser Scan Stabilization," *Rev. Sci. Instrum.* 63(5) (May 1992).

European Search Report issued in European Patent Application No. 02 017 938.8 on Apr. 4, 2005.

* cited by examiner

FIG.8

SYSTEM AND METHOD FOR MONITORING THE PERFORMANCE OF DENSE WAVELENGTH DIVISION MULTIPLEXING OPTICAL COMMUNICATIONS SYSTEMS

RELATED APPLICATION

This application claims benefit of International Aplication No. PCT/EP99/097340, filed Oct. 5, 1990 having a priority date of Oct. 5, 1998 based on DE 198 45 701.4. This application has not been published in English.

BACKGROUND OF THE INVENTION

The present invention relates to optical monitoring, and more particularly to a system and method of monitoring the performance of dense wavelength division multiplexing optical communication services.

In densely packed WDM systems (dense WDM, DWDM) messages are communicated by light signals at different wave lengths via a single fiber only. Each wave length is the carrier of an information signal. All channels are within the wave length range from presently roughly 1,520 nm to 1,565 nm. The inter-channel separation amounts to a few nanometers or some hundreds of picometers, respectively. For standardization of these telecommunication systems, the international ITU-T Working Group has recommended the wave lengths (corresponding to the channels) to be used with an inter-channel separation of 100 GHz (□0.8 nm) as standard. The ongoing development of these DWDM systems aims at the extension of the utilizable wave length range up to 1,610 nm for example.

Systems for the continuous monitoring of all characteristic parameters with the possibility of signal regeneration or improvement are required at many sites of this communication system. The most important parameters include the wave length and the capacity of all channels, the monitoring of the line width and the wave length drift of the lasers as well as the signal-to-noise ratio in each communication channel. Typical specification requirements for monitoring are:

wave length measurement per channel with an absolute precision of 0.08 nm and a resolution of 0.01 nm, power metering per channel with an absolute precision of 0.4 dB and a resolution of 0.1 dB, S/N measurement between the channels with an absolute precision of 0.4 dB at 0.1 dB, reproducibility and a dynamic ratio of 33 dB at minimum, reliability over $10^{10}$ measuring cycles (20 years approximately), low PDL (0.1 dB max.), small physical size.

Fundamentally different methods are suitable for monitoring purposes, which are employed in conventional optical spectrum analyzers.

Tunable narrow-band filters are used for wave length selection in the filtering technique. Acousto-optical filters (e.g. those produced by Wandel & Goltermann) or piezo-electrically controlled micro filters (e.g. those from the Queensgate company) or tunable fiber Bragg gratings (e.g. those from ElectroPhotonics Corp.) are applied, which can be tuned directly via an electrical parameter.

The filtering technique is not only restricted to the optical filtering operation but it may also be performed at the electrical signal level after a preceding conversion into electronic signals. With electronic filtering, the optical signal is mixed with an optical reference signal in a non-linear optical component while the differential frequencies are analyzed on an electronic spectral analyzer (Hewlett Packard Co.).

Another variant is the grating monochromator technique wherein either the grating is rotated or the spatially resolved signal spectrum is sensed by means of a single photodiode, or the grating is stationary and a scanning deflection mirror is provided in front of the exit slit of the monochromator, or a mobile reflecting element varies the angle of incidence of the radiation on the grating (e.g. Photonetics company), or a stationary grating is used in combination with a line of photodiodes as detector unit (e.g. Yokogawa company).

In the interferometric technique, the spectrum is obtained from the detector signal of a Michelson interferometer with variable optical paths, with application of the Fourier transform (e.g. Hewlett Packard company).

None of the aforementioned conventional systems is suitable to satisfy the high demands made on a monitoring module for a DWDM system in terms of resolution, measuring accuracy, ASE measurement and dynamic ratio, at the same time and in a suitable manner and to satisfy moreover the demands in terms of short measuring intervals, longevity and low space requirements as well as low-cost realization.

What is desired is a suitable measuring system that satisfies the demands on a DWDM monitoring system in terms of resolution, measuring accuracy, ASE measurement and dynamic ratio, short measuring intervals, longevity and low space requirements as well as a low-cost production.

BRIEF SUMMARY OF THE INVENTION

In accordance with the present invention this object is achieved with a system permitting two variants. This aim is firstly reached in accordance with the invention with a narrow-band tunable band-pass filter in the form of a specific grating spectrometer permitting a high resolution and a high-speed sampling of the measured values according to Variant 1, and secondly the solution according to the present invention is presented in a Variant 2 as a purely electronic solution using an opto-electronic cross correlator.

The objects, advantages and other novel features of the present invention are apparent from the following detailed description when read in conjunction with the appended claims and attached drawing.

DETAILED DESCRIPTION OF THE INVENTION

Variant 1

Figure 1:
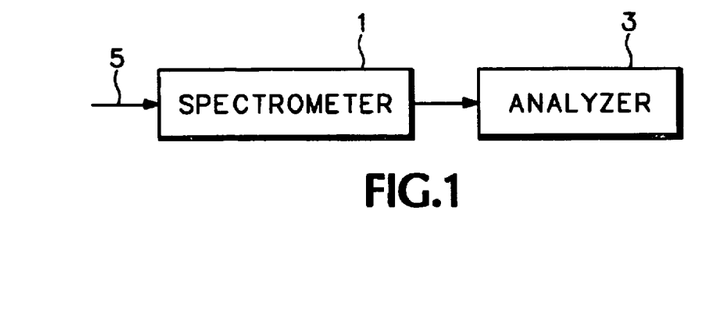
FIG. 1 shows the fundamental structure of a narrow-band optical band-pass filter having a grating spectrometer and an analyzer unit.

FIG. 1 illustrates the fundamental structure of the embodiment including a fiber input 5, a narrow-band tunable band-pass filter 1 and an analyzer 3.

High-resolution spectrometers generally require several dispersive and imaging elements and are adjusted to the wave length to be detected in a complex manner.

Figure 3:
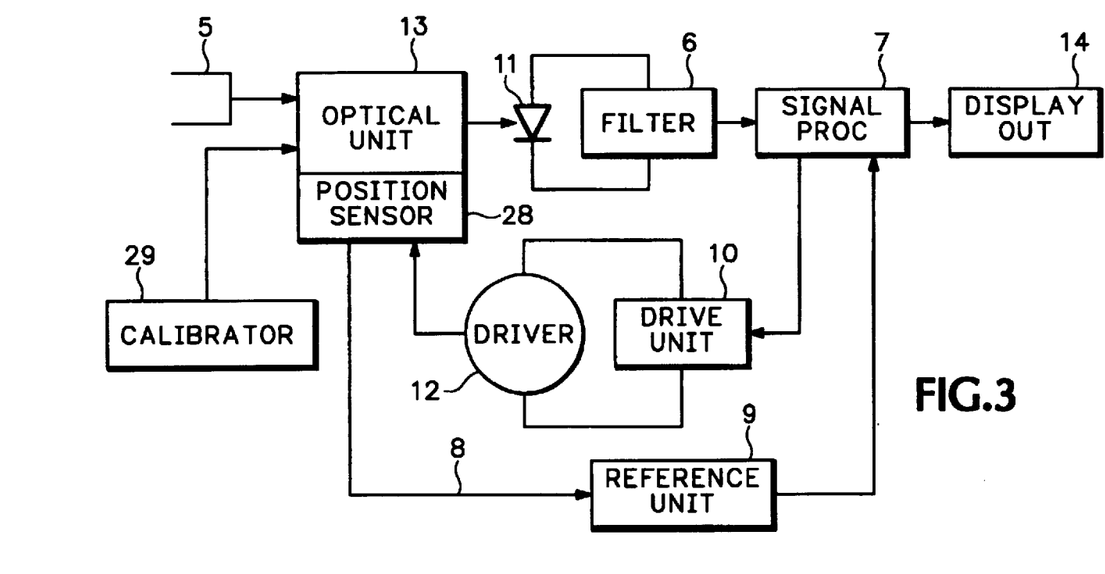
FIG. 3 shows the principle of a grating spectrometer with multiple passages.

An example of a system based on a multiple spectrograph is illustrated in FIG. 3. The measuring light arrives through a fiber optical waveguide 5 into the optical unit 13 including the spectrometer. The light selected by a particular wave length arrives from the optical unit 13 on the photo detector 11. The electrical signal obtained from the measuring light in the photo detector is passed via a low-pass filter 6 to the signal processor 7. There the wave length is assigned which the reference unit 9 has determined from the position signal 8 of the position sensor 28 and which arrives at the signal processor 7, too. That processor generates also the necessary control signals for the driving unit 10 and the grating drive 12 that adjusts the wavelength-determining element in the optical unit 13. The characteristic values of the instantaneously set wave length, which are calculated in the signal processor, are displayed to the user in the display unit 14 and made available for being passed on.

Figure 4:
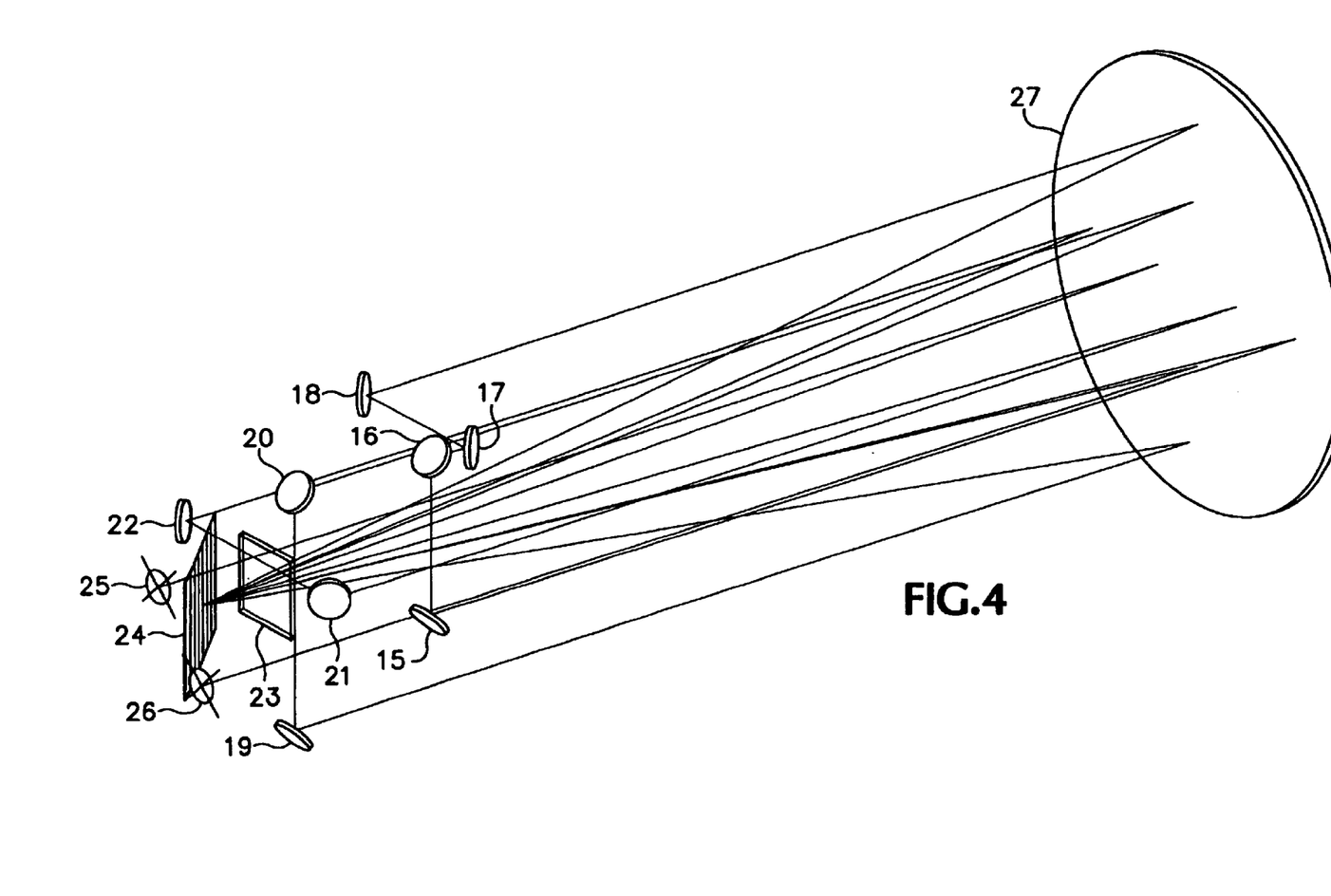
FIG. 4 illustrates an example of the structure and the optical path in the grating spectrometer with multiple passages.

The problem to achieve a high resolution is solved, in accordance with FIG. 4, by the structure of a specific grating spectrometer 1 wherein an echelle or ruled grating or a blazed grating for the wave length range to be monitored is mounted in a combined array according to Ebert and Fastie and by approximation in a Littrow array. The optical paths for the incident and exiting light are almost symmetrical there. Due to the multiple use of the grating and the single imaging element, that is equally provided for multiple use, in combination with several beam deflection systems composed of flat mirrors or prisms, a compact, stable, highly dispersive and low-cost structure is achieved. A predominantly symmetrical optical path in the optical unit reduces imaging errors resulting in a dramatic impairment of the resolution. The movement of the grating for wave length selection can take place at a high speed because only a single element is moved. The application of a single detector element only prevents site-dependent or element-dependent variations in the responsiveness. Moreover, a further-going independence from polarization effects such as PDL (polarization-dependent losses) is achieved because with the blazed grating or the ruled grating, respectively, the beams are incident on the diffracting grating surfaces almost orthogonally and cover a wide grating length at a high angle of incidence with a small beam diameter.

Figures 5, 6:
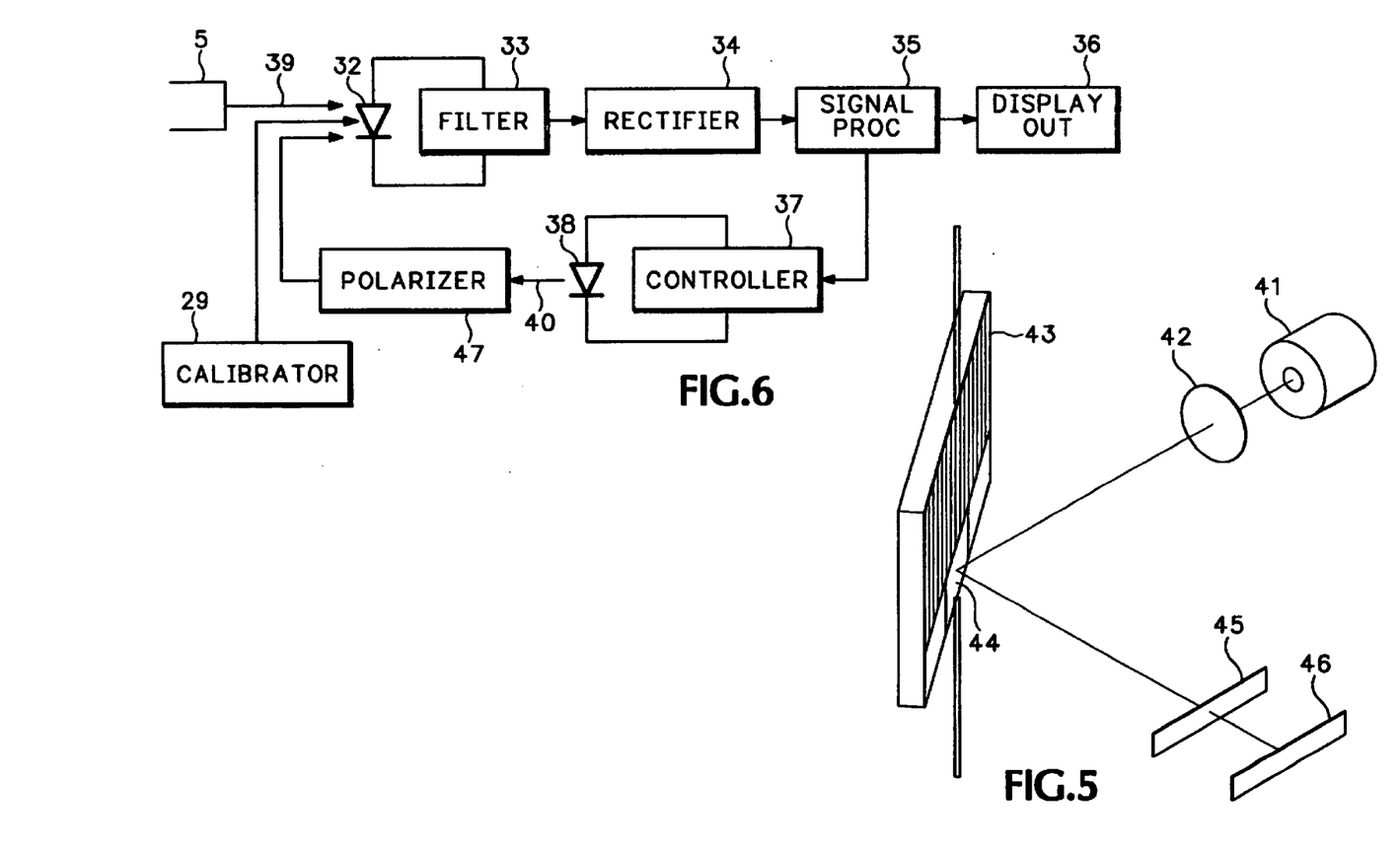
FIG. 5 shows the structure of a position sensor.
FIG. 6 illustrates an example of an opto-electronic cross-correlator.

The angular position of the dispersing grating, that is decisive for assigning the measuring wave length, is determined by means of an auxiliary means, the position sensor, according to FIG. 5.

For a general grating the fundamental equation $$m\lambda = d(\sin \alpha + \sin \beta) \quad (I)$$

wherein m denotes the order, d represents the inter-line spacing and $\alpha$, $\beta$ indicate the angles of incidence or exit, respectively. As in a Littrow array grating the angles of incidence and exit are almost identical, the definition according to Fastie furnishes the following simplified equation:

$$m\lambda = 2d \sin \alpha \quad (II)$$

In the definition according to Ebert the basic equation (I) applies. The optical path of the beams is so designed that the most symmetrical optical path possible will be available with respect to the concave mirror. As in this case, too, the angles of incidence or exit are almost equal, the angular dispersion comes also under a similar magnitude order as in the definition according to Fastie. Due to the multiple passages—here quadruplicate, for instance—of the radiation through the dispersive element the overall dispersion and hence the resolution of the device is quadruplicated, too. On account of the utilization of mirror areas n symmetrical positions, the symmetrical optical path relative to the imaging concave mirror results in an extensive compensation of the imaging errors, particularly of astigmatism that leads to a substantial deterioration of resolution.

With a dielectric optical preliminary filter as band-pass element in the multiple optical paths any light of wavelengths beyond the DWDM range is suppressed. In such a case the filter is then passed only by the DWDM range, for instance, with a width of roughly 100 nm.

The detection of the entire spectrum is performed by a single radiation detector while the adjustment of the wave length to be detected is realized by rotating the grating about its vertical axis, which is performed both by motor drive means and by the configuration as spring-mass array with torsion bars, capable of oscillating.

Furthermore, the position of the grating is detected by a secondary laser with a very high precision. The focused beam of the secondary laser is directed onto a reflecting surface rigidly connected to the grating while the reflected beam is supplied to a position sensor including an incremental scale.

FIG. 4 illustrates an example of an appropriate embodiment. The light to be examined arrives through the entrance opening, that is configured as fiber input 25, into the optical system. The diverging optical path is shaped by the collimator and camera mirror 27 to achieve a parallel pencil that is passed on by approximation onto the grating 24 at the blaze angle. The diffracted pencil then arrives again at the collimator and camera mirror 27, is focused by the latter and arrives on the mirrors 21 and 22 where it is deflected in a way that now the pencil which is divergent again, is passed along an axis parallel with the axis of the collimator and the camera mirror 27. The parallel pencil then arrives at the grating 24 again, is diffracted there again and is incident on the collimator and camera mirror 27. From there, the beam is now directed to the mirror 15 and via the mirrors 16, 17 and 18. The beam has now reached a position above the optical axis and is incident again on the collimator and camera mirror 27, arrives from there again at the grating 24 and arrives via the collimator and camera mirror 27 on the grating 24 a second time. From there, the beam, that is now dispersed even more strongly, arrives again at the collimator and camera mirror 27 and is passed from there to the mirrors 19 and 20, is incident on the collimator and camera mirror 27 again, then on the grating 24, and then on the collimator and camera mirror 27 for the last time. The focused and four times dispersed beam then arrives at the signal output 26. All beams arriving on the grating 24 several times and returned from there back to the collimator and camera mirror 27 again must pass through the dielectric band-pass filter 23 and are cut there to the useful frequency band.

FIG. 5 illustrates an example of a structure for detecting a position. The light of a secondary laser 41 is focused through the optical system 42 on the incremental scale 45. The rotation of the grating 43 and the involved rotation of the mirror 44 rigidly connected to the grating results in a deflection of the laser beam over the incremental scale 45.

The influence which the incremental scale takes on the laser intensity is detected by the joining detector 46 and made accessible for analysis.

Variant 2

Figure 2:
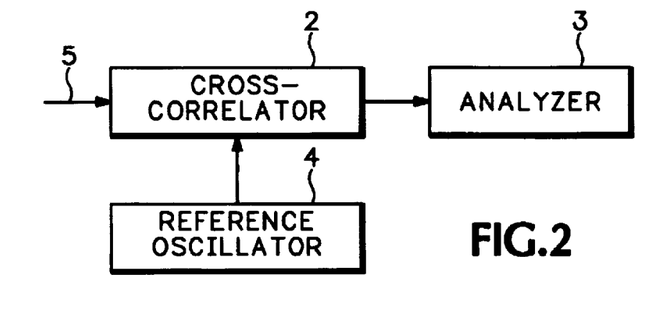
FIG. 2 illustrates the principle of an opto-electronic cross-correlator.

The Variant 2 according to FIG. 2—an entirely electronic solution in the form of an opto-electronic cross correlator 2—applies to methods known per se from high-frequency technology. In this case, however, two optical signals are mixed with each other without a previous conversion into electrical signals. These two signals are firstly the working light 5 to be examined and secondly the reference light 5 originating from a tunable laser 4. When the reference oscillator (laser) is tuned a beat frequency is created whose frequency decreases as it approaches the frequency of the working light; when the frequencies are equal it approaches zero. This permits the use of components envisaged for application in the low-frequency range and hence also for the mixer output of a high-impedance load resistor. This results in a substantial improvement of the responsiveness in detection. While the solutions known from the technique of optical superposition or interference operate usually on a load resistance of 50 Ohm, this array allows for the application of resistors of some kilo Ohm. The frequency range to be processed extends from a freely selectable lower frequency limit, that is expediently higher than interfering mains frequency and base band components caused by the modulation of intensity of the optical carriers, up to an upper frequency limit which determines the bandwidth of integration. This frequency is expediently not substantially lower than the spectral width of the tunable laser acting as local oscillator. The advantage of such a system resides in the compact design, in the omission of mobile parts, in a purely electronic solution using components appropriate for application in the low-frequency range, in the measuring rate restricted only by the tuning speed of the reference oscillator, and in a high responsiveness at an almost optionally small bandwidth of analysis.

The two light signals are defined by the following two relationships:

$$E_M = E_M \left[ i \int_0^t \omega t \, dt \right] e_M$$

$$E_R = E_R \left[ i \int_0^t \Omega t \, dt \right] e_R$$

This results in the following photo-electric current:

$$I = |E_M + E_R|^2$$
$$= E_M * E_R + E_R * E_R + 2 \, Re\{E_M * E_R\}$$
$$= E_M^2 + E_R^2 + 2 \, E_M E_R \cos\left[\int_0^t (\omega - \Omega) t \, dt\right]$$

It is apparent that the last term defines a current variable in time, that is dependent on the amplitudes of both radiations and on the difference of the light frequencies. When both frequencies are approaching each other a low-frequency signal is created with the maximum amplitude $I_{max} = 2 \, E_M E_R$. Moreover, the direction of polarization of both light sources is equally considered. In order to eliminate this dependence, it is possible, on the one hand, to render the reference light laser or the source of working light statistically variable in terms of its direction of polarization, or, on the other hand, to make two orthogonally polarized beams available, for instance, as reference light sources while the optical mixture is performed in two separate detectors with a subsequent logic operation in the signal processor. For another solution, for example, it is possible to switch the reference laser over in a time-sequential manner in the polarization plane while the subsequent measurements in succession are subjected to a logic operation in the signal processor.

FIG. 6 shows an example of Variant 2. The radiation to be measured arrives as working beam via the fiber input 5 on a non-linear optical component, the detector 32. At the same time, the reference beam 40 is passed via the polarizer 47 to the detector 32. The electrical mixed products generated from the optical signals arrive via the low-pass filter 33 to the rectifier 34 and from there at the digital signal processor 35 which realizes the evaluation of the signals, controls the display unit 36 and supplies the reference laser controller 37 by means of the tunable laser 38.

By employment of the wave length calibrator 29 for wave length assignment the provision of wave length references is made possible in both variants. To this end known arrays such as absorption cells are suitable for this purpose, which contain gases displaying characteristic lines of absorption in the required wave length range. When such a cell is inserted into the optical path, for instance in the spectrometer, and when the system is exposed to wide-band illumination characteristic signal developments are created which permit a precise assignment of the wave lengths. Another possibility is the measurement o the reference laser wave length by means of an additional interferometer array. In such a system, one part of the light from the tunable reference light laser is passed on to an interferometer that is provided with a supplementary highly precise light source and in which the interference signals vary in time, which are generated when the reference light laser is tuned, serve to assign the wave length present in that moment.

The combination of the working light and the reference light can be realized in different manners. FIG. 6 illustrates the free irradiation with the measuring light, the reference light and possibly the calibration light, which are incident on the non-linear detector component 32.

Figure 7:
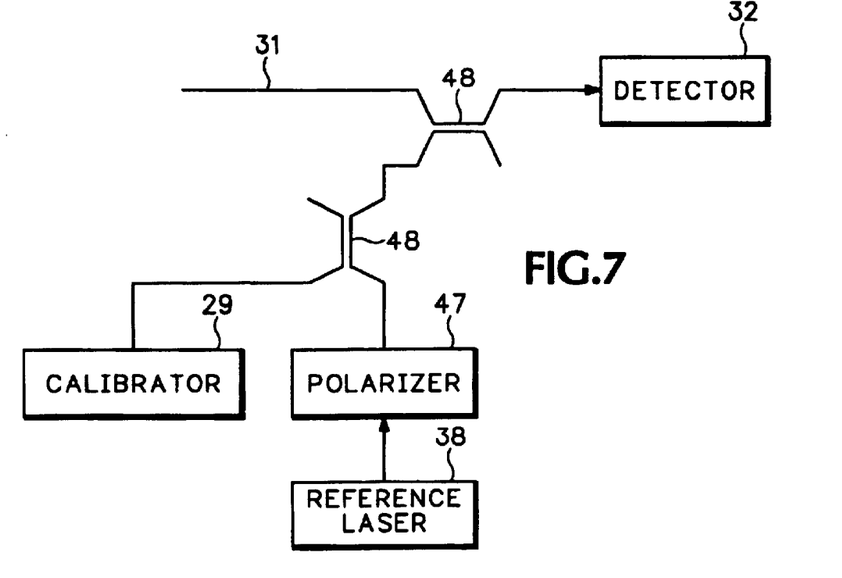
FIG. 7 illustrates a beam combination by means of fiber couplers.

FIG. 7 shows that the various beams are combined by means of a fiber optical component that is implemented in the form of a bulk or Y-type fiber coupler 48. The working signal at the fiber input 31 arrives via the coupler 48 at the detector 32. The light of the reference laser 38 is combined with the light of the wave length calibrator 29 via the polarizer 47 in another coupler 48 and added to the working light in a first coupler 48.

Figure 8:
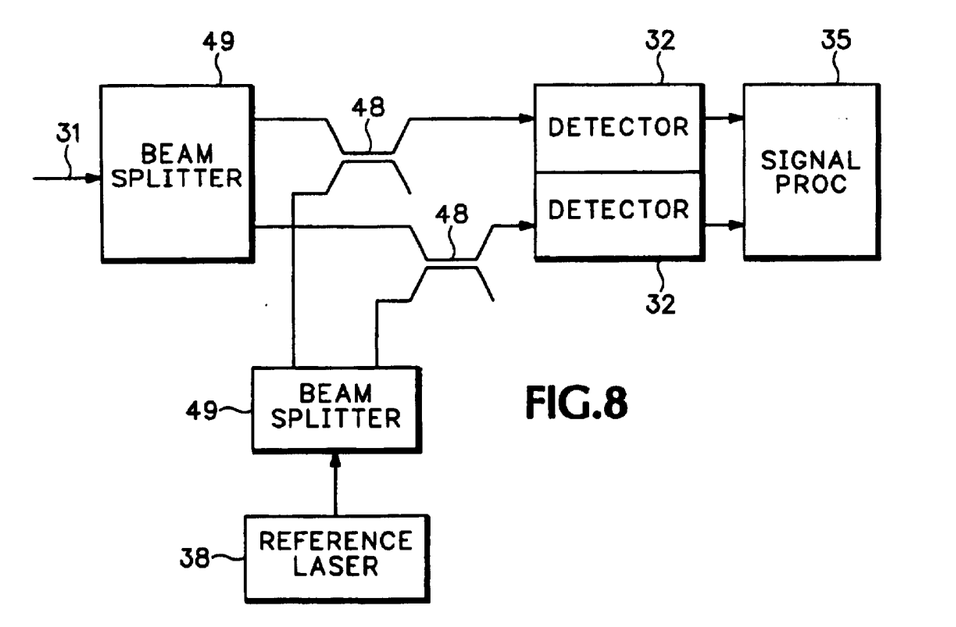
FIG. 8 is a view of a dual-channel opto-electronic cross-correlator.

FIG. 8 illustrates an example of a dual-channel design permitting the consideration of the aforementioned dependence on polarization. The working light is subdivided into two channels of orthogonal polarization by means of a polarizing beam splitter 49. The reference laser 38 is equally split into two beams of orthogonal polarization and passed, together with the associated working beams, to two separate detectors 46. The output signals of both detectors then arrive at the signal processor 35 where they are processed.

What is claimed is:

1. A system for monitoring the performance of DWDM multi-wavelength systems comprising:
    means for converting an optical signal for a particular wavelength from the DWDM multi-wavelength system to an electrical signal;
    means for processing the electrical signal to determine the performance of the DWDM multi-wavelength system at the particular wavelength and for controlling the converting means so that each particular wavelength of the DWDM multi-wavelength system is processed and wherein the converting means comprises:
    means for mixing the optical signal with a tunable reference optical signal to produce a combined optical signal; and
    a photodetector for converting the combined signal to the electrical, wherein the mixing means comprises:
    means for dividing the optical signal and the reference optical signal each into corresponding orthogonal polarized beams; and means for combining the respective polarized beams of like polarization to form a pair of combined optical signals as the combined optical signal.

2. The system as recited in claim 1, wherein the photodetector comprises a pair of photodetectors having the respective combined polarization beams as input and providing a pair of electrical signals at the respective outputs as the electrical signal.

3. A system for monitoring performance of a DWDM multi-wavelength system comprising:

means for converting a portion of an optical signal from the DWDM multi-wavelength system at a particular wavelength to an electrical signal wherein the converting means comprises an optical unit having the optical signal as an input and the particular wavelength portion of the optical signal as an output wherein the optical unit comprises a grating spectrometer having the optical signal as an input and providing the particular wavelength portion as an output wherein the grating spectrometer comprises a movable grating having a wavelength range that covers a measurement range for the DWDM multi-wavelength system;

an imaging element for reflecting the optical signal; and a beam deflection system mounted such that the optical signal incident on the imaging element and the optical signal exiting from the imaging element are essentially symmetrical, the movement of the movable grating selecting the particular wavelength portion, and the optical signal being subjected to multiple passes between the movable grating and the image element;

wherein the movable grating is mounted with respect to the imaging element and the beam deflection system in a combined array according to Ebert and Fastie and by approximation in a Littrow array; and means for processing the electrical signal to determine the performance of the DWDM multi-wavelength system at the particular wavelength and for controlling the converting means so that each particular wavelength of the DWDM multi-wavelength system is processed.

4. The system as recited in claim 3 wherein the converting means comprises a narrow-band tunable bandpass filter having the optical signal as an input and the particular wavelength portion of the optical signal as an output.

5. The system as recited in claim 3 wherein the converting means comprises:

a photodetector having the particular wavelength portion as an input and the electrical signal as an output.

6. The system as recited in claim 5 wherein the converting means further comprises a lowpass filter having an input coupled to the output of the photodetector and having an output to produce the electrical signal.

7. The system as recited in claim 3 wherein the grating spectrometer further comprises a dielectric optical filter situated between the movable grating and the imaging element so that reflections of the optical signal between the movable grating and the imaging element are bandpass filtered.

8. The system as recited in claim 3 wherein the movable grating comprises one selected from the group consisting of a ruled grating and a blazed grating.

9. The system as recited in claim 3 further comprising means for determining an angular position of the movable grating, the angular position determining the particular wavelength portion.

10. The system as recited in claim 9 wherein the determining means comprises:

a high precision light source for generating a focused beam;

a reflecting surface rigidly coupled to the movable grating upon which the focused beam impinges; and a position sensor for receiving the focused beam reflected from the reflecting surface to determine the angular position.

11. The system as recited in claim 9 further comprising means for moving the angular position of the grating to select the particular wavelength portion.

12. The system as recited in claim 11 wherein the moving means comprises:

a drive motor coupled to the movable grating for moving the movable grating about a vertical axis in response to a control signal;

a spring-mass array with torsion bars capable of oscillating coupled to the drive motor; and means for driving the drive motor in response to a control signal from the controlling and processing means.

13. The system as recited in claim 10 wherein the position sensor comprises:

an incremental scale that influences the intensity of the reflected focused beam as a function of the point on the incremental scale upon which the reflected focused beam impinges; and a detector for detecting an intensity of light from the incremental scale, the intensity being a measure of the angular position.

14. The system as recited in claim 3 wherein the converting means comprises:

means for mixing the optical signal with a tunable reference optical signal to produce a combined optical signal; and a photodetector for converting the combined optical signal to the electrical signal.

15. A system for monitoring performance of a DWDM multi-wavelength system comprising:

means for converting a portion of an optical signal from the DWDM multi-wavelength system at a particular wavelength to an electrical signal;

wherein the converting means comprises an optical unit having the optical signal as an input and the particular wavelength portion of the optical signal as an output; and means for mixing the optical signal with a tunable reference optical signal to produce a combined optical signal wherein the mixing means comprises:

a tunable laser for providing the tunable reference optical signal under control of the processing and controlling means;

means for selectively polarizing the tunable reference optical signal to produce a polarized reference optical signal in one of two orthogonally polarized states; and means for combining the optical signal and the polarized reference optical signal to produce the combined optical signal;

a photodetector for converting the combined optical signal to the electrical signal; and means for processing the electrical signal to determine the performance of the DWDM multi-wavelength system at the particular wavelength and for controlling the converting means so that each particular wavelength of the DWDM multi-wavelength system is processed.

16. The system as recited in claim 15 further comprising a wavelength calibrator for providing a calibrated wavelength optical signal to irradiate the photodetector.

17. The system as recited in claim 15 wherein the combining means comprises simultaneous irradiation of the photodetector by the optical signal and the polarized reference optical signal.

18. The system as recited in claim 16 wherein the combining means further comprises simultaneous irradiation of the photodetector with the calibrated wavelength optical signal as well.

19. The system as recited in claim 15 wherein the combining means comprises a first optical coupler for combining the optical signal and the polarized reference optical signal.

20. The system as recited in claim 19 wherein the combining means further comprises a second optical coupler for combining a calibrated wavelength optical signal with one of the optical signal and polarized reference optical signal prior to combining with the other one in the first optical coupler.

21. The system as recited in claim 16 wherein the wavelength calibrator comprises an absorption cell having a calibrated wavelength spectrum.

22. The system as recited in claim 16 wherein the wavelength calibrator comprises an interferometer array including a supplementary light source.

* * * * *